(12) United States Patent
Coffman et al.

(10) Patent No.: US 6,553,438 B1
(45) Date of Patent: Apr. 22, 2003

(54) METHODS AND SYSTEM FOR MESSAGE RESOURCE POOL WITH ASYNCHRONOUS AND SYNCHRONOUS MODES OF OPERATION

(75) Inventors: Jerrie L. Coffman, Beaverton, OR (US); Mark S. Hefty, Aloha, OR (US); Fabian S. Tillier, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/556,318

(22) Filed: Apr. 24, 2000

(51) Int. Cl.[7] ................................................ G06F 3/00
(52) U.S. Cl. ........................... 710/52; 710/19; 710/20; 710/29; 710/53; 710/56; 710/61; 709/104; 709/248; 709/314
(58) Field of Search .............................. 710/52, 19, 20, 710/29, 36, 53, 54, 56, 61; 709/104, 248, 314, 245, 313, 316; 711/5; 370/450

(56) References Cited

U.S. PATENT DOCUMENTS 5,982,780 A * 11/1999 Bohm et al. ................ 370/450
6,125,399 A * 9/2000 Hamilton .................... 709/245
6,233,623 B1 * 5/2001 Jeffords et al. ............. 709/316
2001/0014918 A1 * 8/2001 Harter et al. ............... 709/313

* cited by examiner

Primary Examiner—Jeffrey Gaffin
Assistant Examiner—Angel L Casiano
(74) Attorney, Agent, or Firm—Antonelli, Terry, Stout & Kraus, LLP

(57) ABSTRACT

Methods and system for a message resource pool with asynchronous and synchronous modes of operation. One or more buffers, descriptors, and message elements are allocated for a user. Each element is associated with one descriptor and at least one buffer. The allocation is performed by the message resource pool. The buffers and the descriptors are registered with a unit management function by the message resource pool. Control of an element and associated descriptor and at least one buffer is passed from the message resource pool to the user upon request by the user. The control of the element and associated descriptor and at least one buffer is returned from the user to the message resource pool once use of the element and associated descriptor and at least one buffer by the user has completed.

29 Claims, 8 Drawing Sheets

METHODS AND SYSTEM FOR MESSAGE RESOURCE POOL WITH ASYNCHRONOUS AND SYNCHRONOUS MODES OF OPERATION

BACKGROUND

1. Field

This invention relates to message buffers for transferring information over a channel-based switched fabric, and more specifically to message resource pools of buffers with asynchronous and synchronous modes of operation.

2. Background

Transfers of information, e.g., data and/or messages, over a channel-based switched fabric usually occur between a host and a target. The host may contain one or more processing units, applications, device drivers, etc. that initiate the transfer, that may be a read or write, between the host and the target. A target may be an I/O controller that may have one or more I/O devices attached to it. Data and/or message transfers may occur between a host and a target by passing control of buffers, that contain the data or messages, between the host and the target. For example, a host may desire to write data to an I/O controller. The host may then store the data it desires to transfer into a series of buffers. The host may then transfer control of these buffers to the I/O controller. The I/O controller then may move the data contained in these buffers at a time convenient to the I/O controller. Similarly, if a host desires to read data or messages from an I/O controller or device attached to an I/O controller, the host may pass control of buffers to the I/O controller. The I/O controller then may write the data from the I/O device to the buffer contained in the host at a time convenient for the I/O controller. Upon completion of a transfer, control of the buffers may then be passed back to the owner (e.g., host) of the buffer.

Host memory regions that are the source or target of data/message passing operations are locked in physical memory from the time that a message passing operation is initiated until the time it completes. This locking insures that the page in memory is physically present when the host or target attempts to read from or write to it, and that the logical to physical mapping of pages in the memory do not change during the operation. Host memory regions that are used to transfer messages and/or data may be required to be registered with a host unit management function. The host unit management function may pass information regarding memory registration to other parts of the host unit that may need it (e.g., switched fabric hardware interface), and may be implemented in hardware, software, or a combination thereof. The unit management function may provide other administrative/management activities or functions on the host unit. A similar unit management function may exist on the target side of the switched fabric. Registration may allow the use of virtual addresses and may also provide a mechanism for protection.

Regions of virtual memory that are used as buffers for I/O operations and that occupy more than a single page may not be physically contiguous. By registering these memory regions, message passing descriptors can refer to them as a single entity rather than a scatter-gather list of physical pages. A scatter-gather list may contain a list of addresses pointing to areas in memory that are to be accessed sequentially. These areas maybe non-contiguous and scattered throughout a memory space. The data is transferred as though all the data is being accessed from one continuous memory. Memory registration gives a host the information it needs to translate virtual addresses to physical addresses on the fly as message passing operations are performed.

Memory registration also provides the ability to protect regions of memory from being accessed and/or modified by another. Devices attached via a PCI bus may be able to read and write any host memory location. As I/O units migrate further away from the host CPU/memory complex, additional protection may be warranted to protect host memory from malfunctioning or malicious devices.

BRIEF DESCRIPTION OF THE DRAWINGS

The present invention is further described in the detailed description which follows in reference to the noted plurality of drawings by way of non-limiting examples of preferred embodiments of the present invention in which like reference numerals represent similar parts throughout the several views of the drawings and wherein.

DETAILED DESCRIPTION

Figure 1:
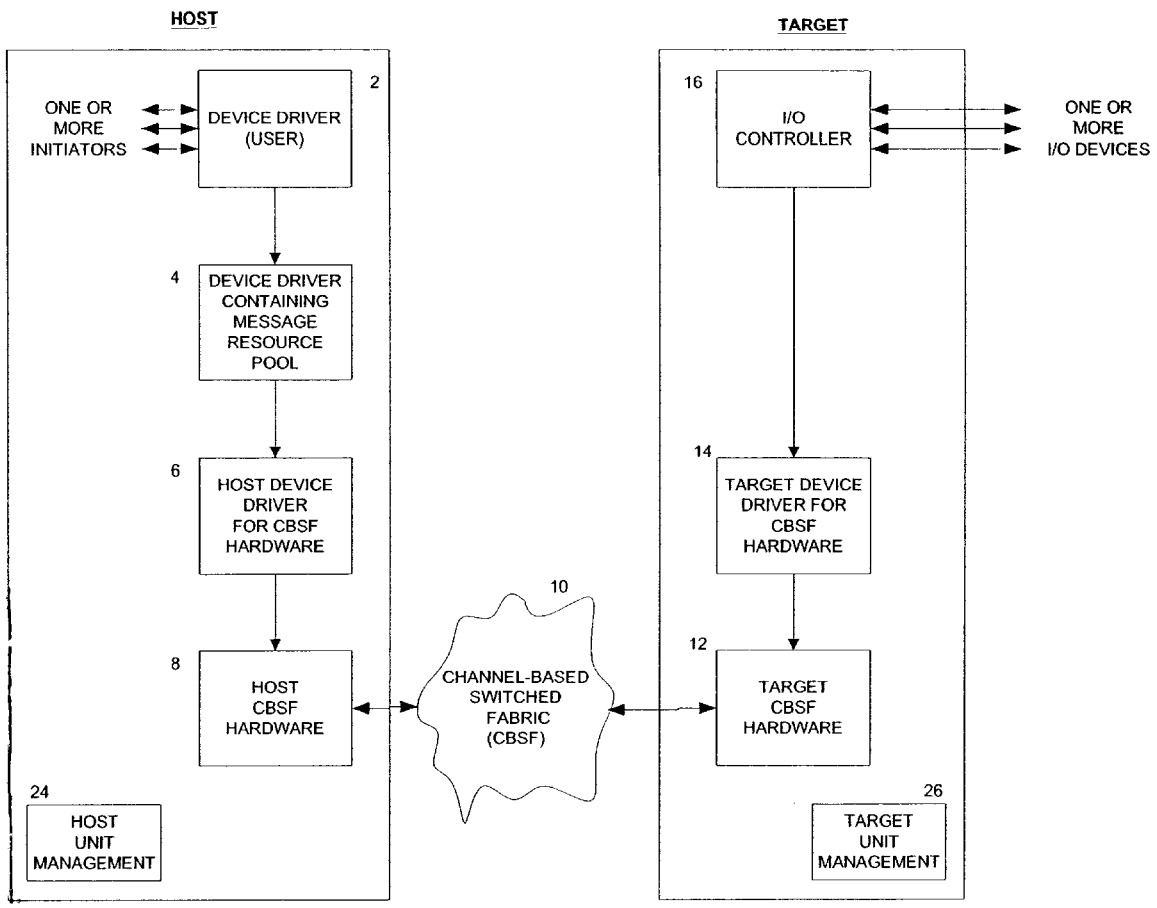
FIG. 1 is a block diagram of an example architecture illustrating a host connected to a target across a channel-based switched fabric according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. According to an embodiment, the channel-based switched fabrics described herein may be based on the Virtual Interface (VI) Architecture Specification, Version 1.0, Dec. 16, 1997.

The present invention is directed to a method for a message resource pool that includes: allocating at least one buffer, at least one descriptor, and at least one message element where each at least one element is associated with one descriptor and at least one buffer and the allocating is performed by a message resource pool; registering the at least one buffer and the at least one descriptor with a unit management function where the registering is performed once by the message resource pool; passing control of one at least one element and associated descriptor and at least one at least one buffer from the message resource pool to a user based on a request from the user; and returning the control of the one at least one element and associated descriptor and at least one at least one buffer from the user to the message resource pool once use of the one at least one element and associated descriptor and at least one at least one buffer by the user has completed.

The allocating may be based on a request from the user. An element count, buffer sizes, and a maximum scatter-gather entries number may be received from the user before the allocating. The passing may occur in response to an asynchronous request from the user for the at least one element. A parameter may be received from the user that notifies the message resource pool that control of all requested at least one elements must be passed to the user at the same time. The parameter may notify the message resource pool that more that control of some of the requested at least one elements may be passed to the user until control of all requested at least one elements have been passed to the user. The asynchronous request from the user may be queued until control of all requested at least one elements have been passed to the user.

The passing may occur in response to a synchronous request from the user for at least one elements. No control of the requested at least one elements may be passed to the user in response to the synchronous request if an asynchronous request has been queued. A parameter may be received from the user notifying the message resource pool that control of all requested at least one elements may need to be given to the user at the same time. At least one of the at least one buffer, the at least one descriptor, and the at least one message element may be aligned on a specific memory boundary. For example, each at least one descriptor may be aligned on a 64 byte memory boundary. The user may be a device driver. The allocating may be for information transfer by a processor or an application. Multiple allocating may occur for information transfers by a processor or an application.

The present invention may be directed to a program, embodied in a tangible medium, when executed causes a computing device to perform: allocating at least one buffer, at least one descriptor, and at least one message element where each at least one element is associated with at least one descriptor and at least one buffer and the allocating is performed by a message resource pool; registering the at least one buffer and the at least one descriptor with a unit management function where the registering is performed once by the message resource pool; passing control of one at least one element and associated descriptor and at least one buffer from the message resource pool to a user based on a request from the user; and returning the control of the one at least one element and associated descriptor and at least one buffer from the user to the message resource pool once use of the one at least one element and associated descriptor and at least one buffer by the user has completed.

The allocating may be based on a request from the user. The passing may occur in response to an asynchronous request from the user for the at least one elements. A parameter may be received from the user that notifies the message resource pool that control of all requested at least one elements may need to be passed to the user at the same time. The parameter may notify the message resource pool that control of some of the requested at least one elements may be passed to the user until control of all requested at least one elements have been passed to the user. The asynchronous request from the user may be queued until control of all requested at least one elements have been passed to the user. The passing may occur in response to a synchronous request from the user for at least one elements. No control of the requested at least one elements may be passed to the user in response to the synchronous request if an asynchronous request has been queued. A parameter may be received from the user notifying the message resource pool that control of all requested at least one elements may need to be given to the user at the same time. The allocating may be for information transfer by a processor or an application. Multiple allocating may occur for information transfer by a processor or an application.

The present invention may be directed to a message resource pool system that includes: a buffer pool containing at least one buffer; a descriptor pool containing at least one descriptor where each at least one descriptor is associated with at least one at least one buffer; an element pool containing at least one element where each at least one element contains pointers to one at least one descriptor and at least one at least one buffer; and a request queue that buffers uncompleted requests for at least one at least one element from a user. The message resource pool is allocated for use by a user. The message resource pool registers the contents of the message resource pool upon allocation and passing control of a specific number of elements to the user upon request for the specific number of elements by the user.

The at least one descriptor may include information regarding data movement using the associated at least one buffer. The at least one descriptor may be associated with multiple at least one buffer that may be in noncontiguous memory locations.

When a memory region is registered, the access rights for that region may be specified. These may include, for example, a combination of write, read, remote DMA read, and/or remote DMA write. A host may open, or make accessible, all of its memory to a target unit (e.g., I/O unit) if the host considers it "trusted", or a host may register and make available only those areas of memory that the host may want the target units to access.

Generally, a device driver registers message buffers just prior to initiating a transfer. After completion of the transfer, the device driver may then unregister the message buffers and put them back in the memory space. This allows the buffers to be used for another transfer. A unit management function may perform the registration of buffers for a device driver. A device driver may then request a number of message buffers. The device driver then must allocate the message buffers, register message buffers, register descriptors relating to the message buffers, format the descriptors, and post the descriptor to the fabric hardware to be transferred. This member registration process is expensive and takes a lot of clock cycles since this has to be performed before each transfer.

FIG. 1 shows a block diagram of an example architecture where a host is connected through a channel-based switched fabric to a target according to an example embodiment of the present invention. FIG. 1 shows blocks of just some of the elements that may reside on a host side of a channel based switched fabric. One or more initiators may use a device driver 2 to initiate information (data and/or message) transfers across the channel-based switched fabric 10. The one or more initiators may be a software application, a processor, or some other computing device or software function. Device driver 2 (user) may access a message resource pool that is contained in another device driver 4, or a message resource pool may be allocated within device driver 2. Device driver 2 or device driver 4 may then access a host device driver for a channel-based switched fabric (CBSF) hardware 6. The host device driver for CBSF hardware 6 maintains items that interface to the host CBSF hardware 8. Host CBSF hardware 8 performs the actual transfer of data and/or messages across channel-based switched fabric 10. Host CBSF hardware 8 also may contain a look-up table of valid regions of memory that may be used to transfer data and/or messages across the fabric. Valid regions may be regions of memory (buffers) that have been registered by device driver 2 with a unit management function 24. The look-up table helps the host CBSF hardware translate virtual addresses into actual physical addresses for the transfer of data and/or messages across the fabric 10.

Host CBSF hardware 8 may transfer data and/or messages across the channel-based switched fabric 10 to target CBSF hardware 12 that resides on the target side of the channel based switch fabric. The target CBSF hardware 12 has an associated device driver 14 that controls it. Target device driver for CBSF hardware 14 may consist of microcode. An I/O controller 16 interfaces to and may control one or more attached I/O devices. The target side unit may also include a unit management function 26 that manages operations related to the target. Although FIG. 1 only shows a single host side and single target side connected to channel-based switched fabric 10, many hosts and many targets may be connected to channel-based switched fabric 10, whereby, data and/or messages may be transferred amongst any combination of the attached devices. Further, the host unit and/or the target unit may be a computer, server, I/O unit, processor, or other computing node, etc. Each node may typically include memory and/or software.

Figure 2:
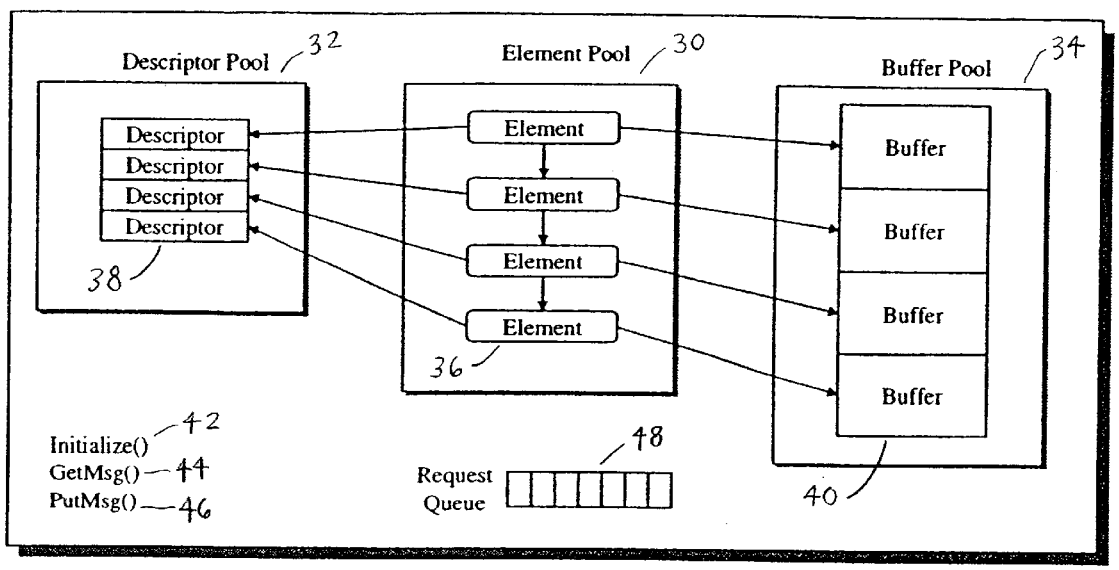
FIG. 2 is a block diagram of an example message resource pool architecture according to an example embodiment of the present invention.

FIG. 2 shows a block diagram of an example architecture of a message resource pool according to an example embodiment of the present invention. As shown in FIG. 2, a message resource pool according to the present invention may include an element pool 30, a descriptor pool 32, a buffer pool 34, and a request queue 48. Element pool 30 may contain one or more elements 36. Each element 36 may be an address of a memory structure with pointers to one or more buffers, and a pointer to one corresponding descriptor. If the buffers are located in memory at non-contiguous addresses (e.g., scatter-gather entries), pointers to each group of non-contiguous buffers may be included in element 36. Therefore, to the user, the blocks of memory may look like one continuous block. Descriptor pool 32 may contain one or more descriptors 38. A descriptor 38 is a structure used to communicate with channel-based switched fabric hardware to perform data movement operations. The format of a descriptor is defined by the hardware. The descriptor 38 may contain information which specifies the size of the buffers 40, whether the data movement operation is a receive or a send operation, and/or the number of buffers referenced by element 36 and being used for the transfer operation. A descriptor may contain some set fields, and may contain fields that vary and are specific to the operation being performed. These operation specific fields may get formatted before the data movement operation occurs. Buffer pool 34 may contain one or more buffers 40. Each buffer 40 may be one or more memory locations. Request queue 48 stores requests from a user for a data and/or message transfer elements that may not have been totally completed. The use of request queue 48 will be discussed in further detail following.

A message resource pool according to the present invention may also include processes for using the pools 30, 32, and 34, and performing the functionality of the message resource pool. These may include an initialization process 42, a get message process 44, and/or a put message process 46. Initialization process 42 relates to allocating a message resource pool for a requesting user, and registering the contents of the message resource pool for the user. Get message process 44 relates to receiving a request from a user for a specific number of elements and associated descriptor and buffers from element pool 30, identifying the type of request, and providing the user with control of the requested number of elements based on the type of request. Put message process 46 relates to placing the elements and associated descriptor and buffers given to the user back into the resource pool after the user has completed use of the buffers by transferring control of the buffers back to the message resource pool.

Initialization process 42 may allocate the requested number of message buffers, descriptors, and message elements. Initialization process 42 may also register the descriptors and message buffers with the unit management function. If there are memory alignment requirements or restrictions, the initialization process 42 may allocate the descriptors in a separate memory region to optimize system memory usage. At least one message element is allocated per set of message buffers. Message elements may not require memory registration and may be created in a separate memory region.

Figure 3:
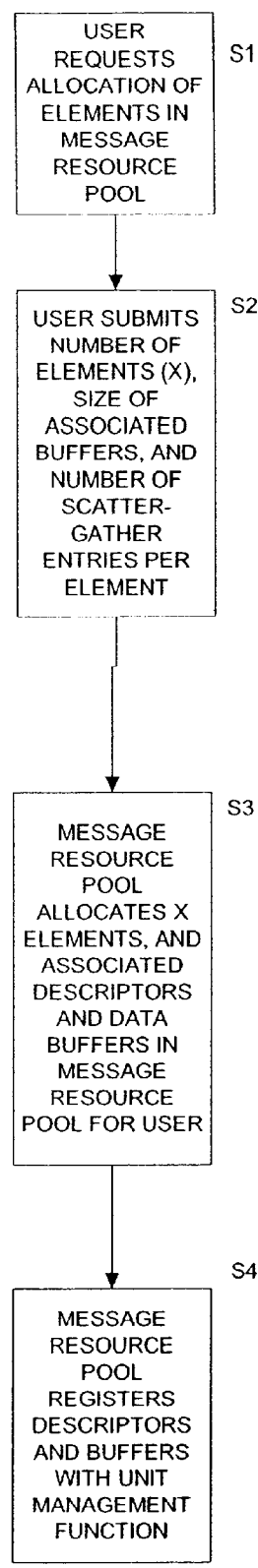
FIG. 3 is a flow chart of an example initialization process according to an example embodiment of the present invention.

FIG. 3 shows a flow chart of an example of initialization process according to an example embodiment of the present invention. A user, e.g., a device driver, may request allocation of elements in the message resource pool for use by the user S1. As a part of this request, the user may submit the number of buffers per element, the size of each buffer, and the number of scatter-gather entries that should be allocated by each element for the user S2. The message resource pool then allocates the number of requested elements (X), and associated descriptors and data buffers in the resource message pool for future use by the user S3. The message resource pool then registers the descriptors and buffers with the unit management function S4. This registration may cause an update to the look-up tables that may be contained in the channel-based switched fabric hardware and notifies the channel-based switched fabric hardware of now valid regions of memory that may be used for information transfer across the fabric.

The number and size of message buffers that a device driver may desire to be allocated in a resource pool may be arbitrary, or may be based upon information known to the device driver. The device driver may know what types of transfers are to be performed, and the size of the data and/or messages that will be transferred. Further, the device driver may know limitations of a receiving side regarding how many data, or messages the receiving side, i.e., target, may handle at one time. Moreover, the number of buffers allocated by the device driver may be limited based on restrictions on the host side, e.g., hardware or memory restrictions. Further, a device driver may allocate multiple buffer pools. In this case, the device driver may use one message buffer pool for sends only, and another message buffer pool for receives only. Or, the device driver may use one message pool with small buffer sizes for small data and/or message transfers, and use a different message buffer pool containing buffers of a larger size for transfers that involve large amounts of data and/or messages. In addition, a device driver may allocate different message pools based on the initiator of the transfer of information. For example, an application may use a device driver which has allocated a message buffer for that particular application, whereas a processor may use the same device driver which has allocated a different message buffer pool for use for operations initiated by that processor. Also, if there are particular alignment requirements that require data to be aligned on 64 byte boundaries, for example, the message resource pool may allocate the buffers such that they are aligned on appropriate boundaries. This an advantageous feature of the present invention in that if an alignment changes, because of a new application, for example, the device driver may simply allocate a new resource pool, therefore, duplicate code does not have to be written or existing code changed, based on a change in the alignment requirement of the data.

A get message process, according to a message resource pool according to an example embodiment of the present invention, may provide asynchronous and synchronous methods of obtaining message elements, descriptors, and buffers from the message pool. The get operation may return a list of elements chained together referencing a set of message buffers and descriptors. The elements may be returned directly through a get message interface for synchronous operation or through a "callback" function for asynchronous operation.

A callback function may be invoked when an asynchronous get message operation completes. A user specifies whether the data and/or message get operation is synchronous or asynchronous by setting a parameter (e.g., callback) accordingly. This information may be put in the descriptor when the descriptor is formatted. A "partialok" parameter, set by the user, notifies the message resource pool whether all requested message elements must be returned as a single operation (i.e., return the total number of requested elements or none), or whether a partial number of the requested message elements may be returned. If the request for message elements is asynchronous and the partialok parameter is set to "true", then the resource message pool may return multiple responses with elements to the user until the total number of message elements requested has been fulfilled. If the request is synchronous and the partialok parameter is set to "true", the resource message pool may return as many elements as are available to the user for use. If the partialok parameter is set to "false", all message elements must be returned as a single operation. The partialok parameter is set as part of the formatting of the request.

Figure 4:
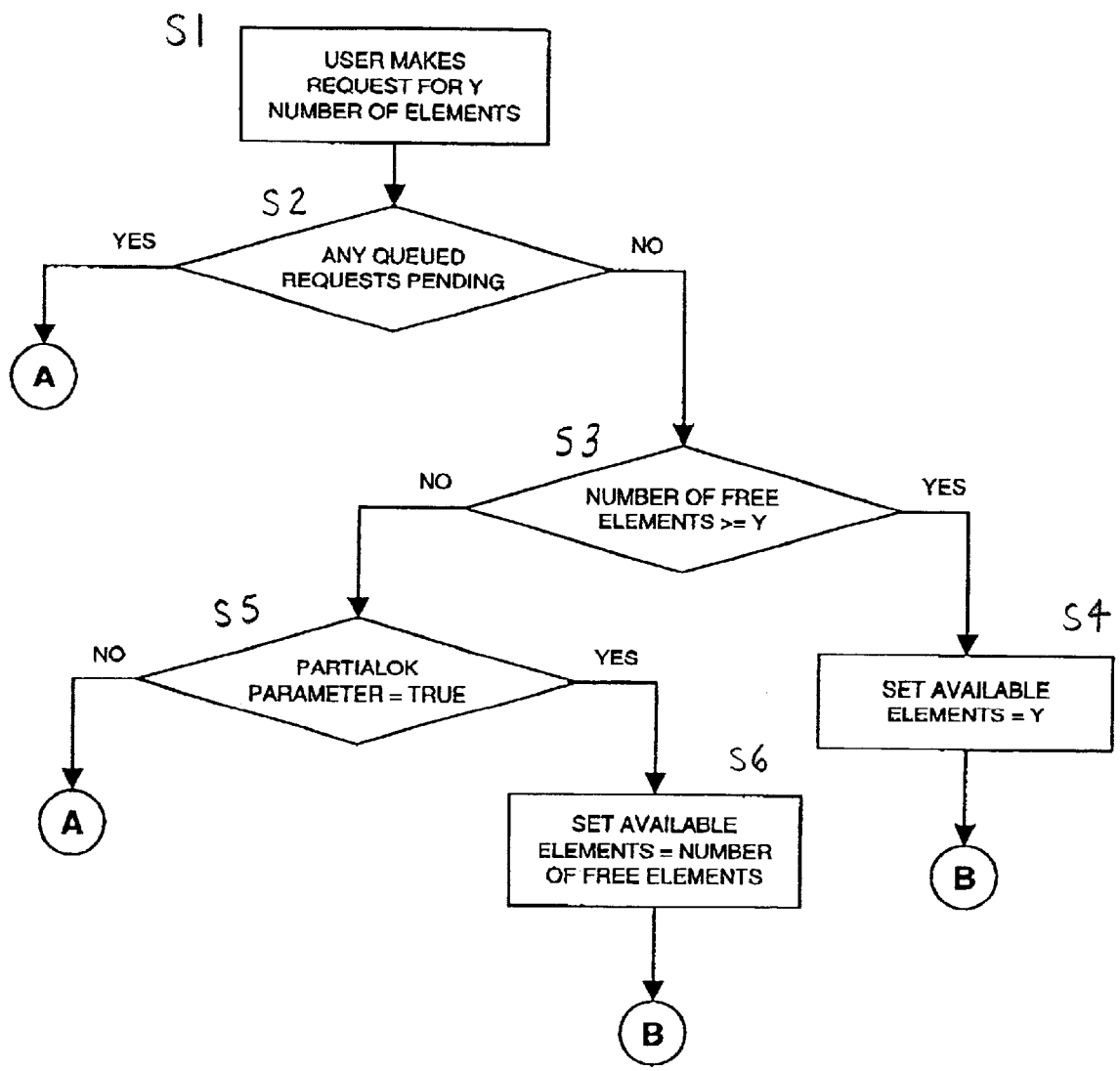
FIG. 4 is a flow chart of the first part of an example get message process according to an example embodiment of the present invention.

FIG. 4 shows a flow chart of the first part of an example get message process according to an example embodiment of the present invention. The user makes a request for a specific number (Y) of elements S1. A check is made to determine if there are any queued requests pending S2. If there are queued request pending, processing proceeds as shown on FIG. 5. If there are no queued requests pending, a determination is made as to whether the number of free elements is larger than or equal to the number requested S3. If the number of free elements is larger than or equal to the number requested, the number of available elements is set equal to the number requested S4. If the number of free elements is not larger than or equal to the number requested, the partialok parameter is checked to determine whether it is "true" S5. If the partialok parameter is "true", the number of available elements is set equal to the number of free elements S6, and processing then proceeds as shown in FIG. 6. If the partialok parameter is not "true", then processing proceeds as shown in FIG. 5.

Figure 5:
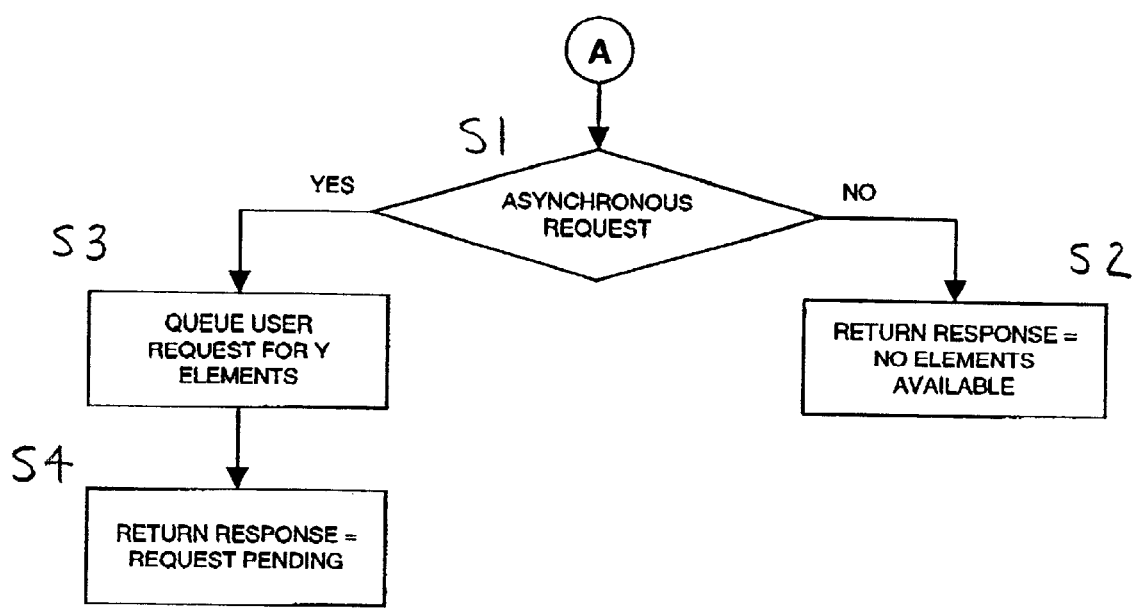
FIG. 5 is a flow chart of another part of an example get message process according to an example embodiment of the present invention.
Figure 6:
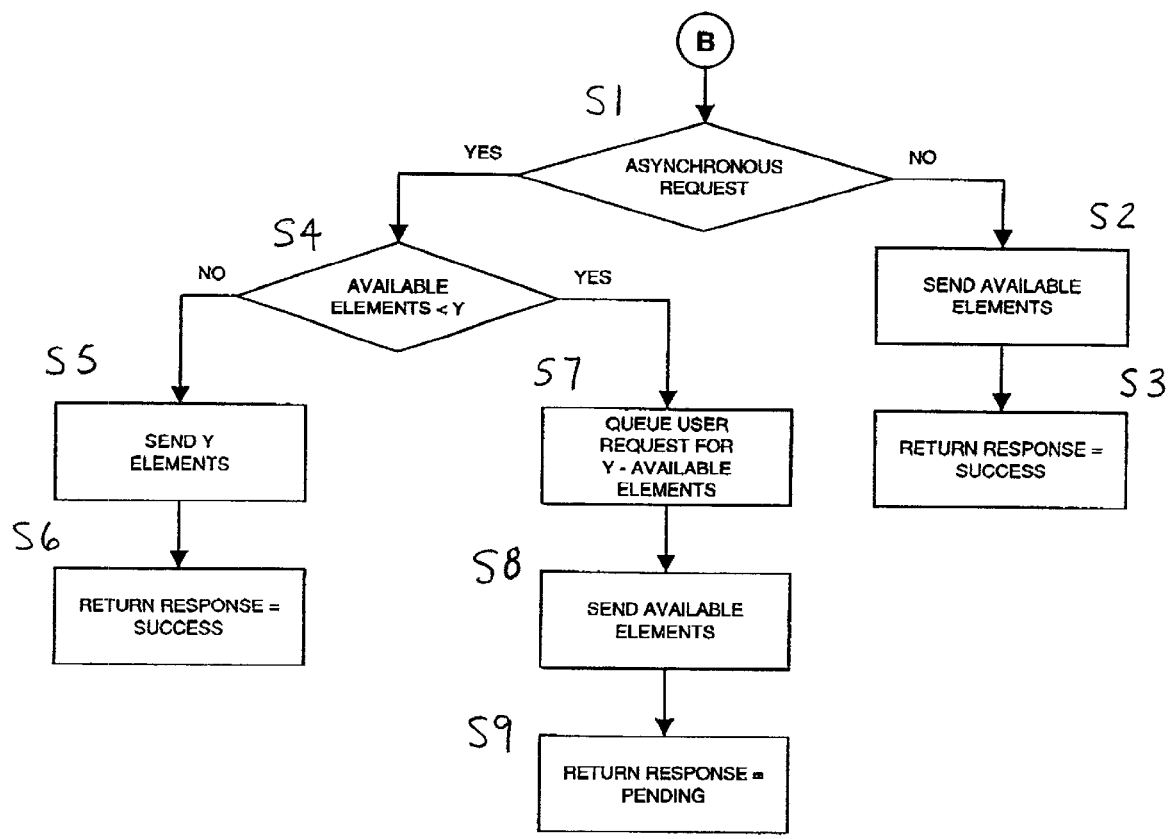
FIG. 6 is a flow chart of a further part of an example get message process according to an example embodiment of the present invention.

FIG. 5 shows a flow chart of another portion of an example get message process according to an example embodiment of the present invention. In continuing processes from FIG. 4, a determination whether the request (FIG. 4, S1) is an asynchronous request is made S1. If the request is not an asynchronous request, a response that no elements are available is returned to the user S2. If the request is an asynchronous, the user request for the requested number of elements (Y) is queued S3. A response that the user's request is pending is returned to the user S4.

FIG. 6 shows a flow chart of a further portion of an example get message process according to an example embodiment of the present invention. In continuing processes from FIG. 4, a determination whether the request (FIG. 4, S1) is an asynchronous request is made S1. If the request is not an asynchronous request, the available elements are sent to the user S2, and a response that the request is a success is returned S3. If the request is an asynchronous request, a determination is made whether the number of available elements is less than the number of requested elements S4. If the number of available elements is more than the number of requested elements, the number of requested elements Is sent to the user S5, and a response that the request is a success is returned S6. However, if the number of available elements is less than the number of requested elements, a user request is queued for the number of requested elements minus the number of available elements S7. The available elements are sent to the user S8, along with a response that the user's request is pending S9.

Figure 7:
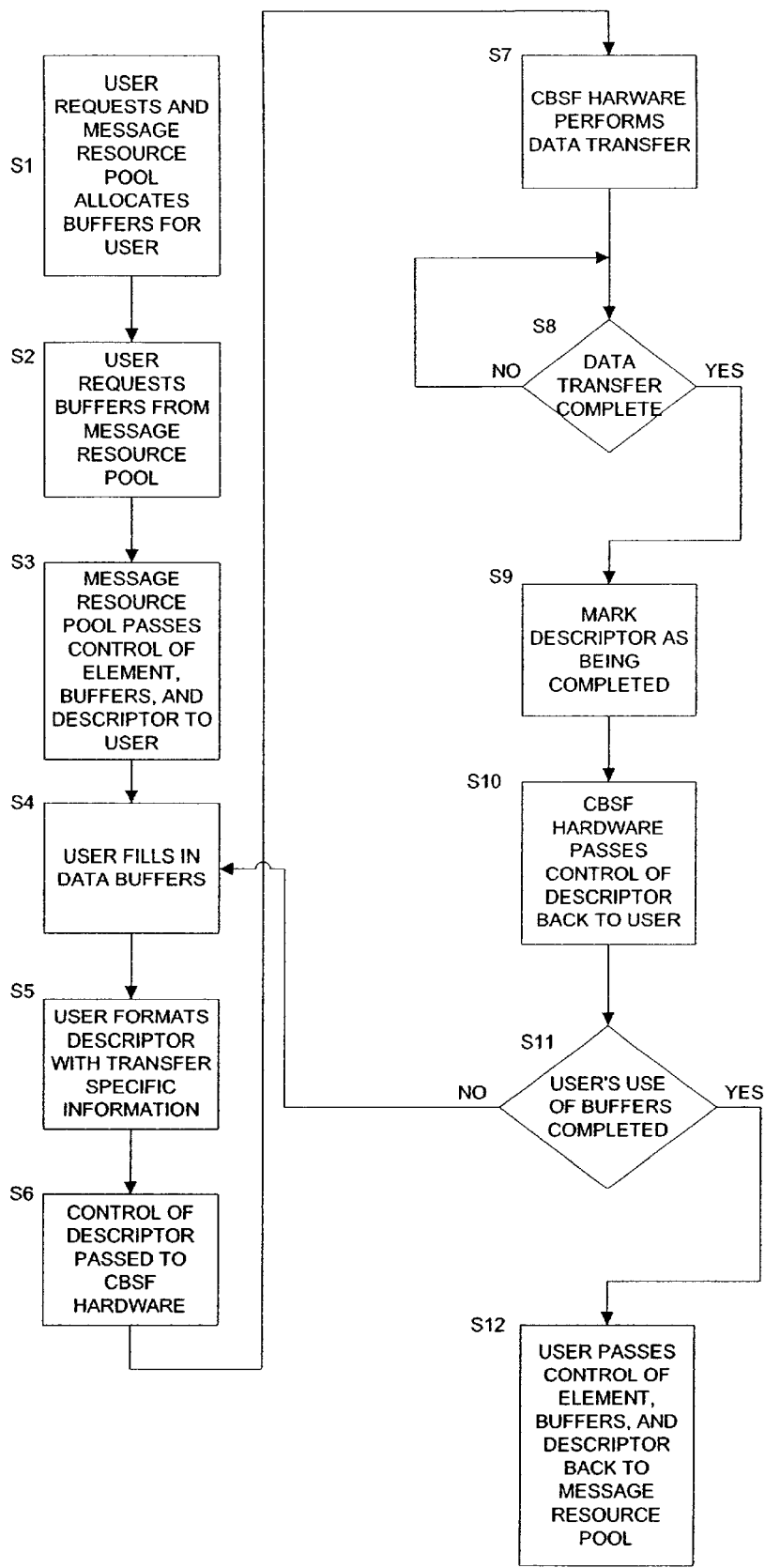
FIG. 7 is a flow chart of an example operation using a message resource pool according to an example embodiment of the present invention.

FIG. 7 shows a flow chart of an example operational process using a message resource pool according to an example embodiment of the present invention. As stated previously, a user requests allocation of and the message resource pool allocates buffers for use by the user S1. After the allocation, the user may use the allocated buffers. If the user has an information (data or message) transfer to perform, the user makes a request for elements and associated descriptors and buffers from the message resource pool S2. The message resource pool then passes control of an element and associated descriptor and buffers to the user S3. The user takes control of these and then fills the associated buffers with the data to be transferred, or prepares the data buffers to receive data S4. The user then formats the descriptor with any transfer specific information S5. This information may include whether the transfer is a send or receive, the size of the data transfer, the source or destination of the data transfer, etc. Control of the descriptor is then passed to the channel-based switched fabric hardware S6. The channel-based switched fabric hardware takes the descriptor, and the associated information contained therein, determines the virtual to physical addressing, and then performs the data transfer S7. The device driver for the channel based switched fabric hardware continually monitors to determine if the information transfer has been completed S8. When the information transfer has been completed, the descriptor is marked as being completed S9. The channel-based switched fabric hardware then passes control of the descriptor back to the user S10. The user then determines if the buffers need to be used for another transfer, or whether the user has completed use of the buffers S11. If the user has completed use of the buffers, the user passes control of the element and buffers back to the message resource pool S12. The may be accomplished by invoking a put message process 46 (FIG. 2) discussed previously. However, if the user has another transfer to perform, the user may then start the process again and fill the data buffers with the new data to be transferred, or prepare the data buffers for receiving data S4.

Figure 8:
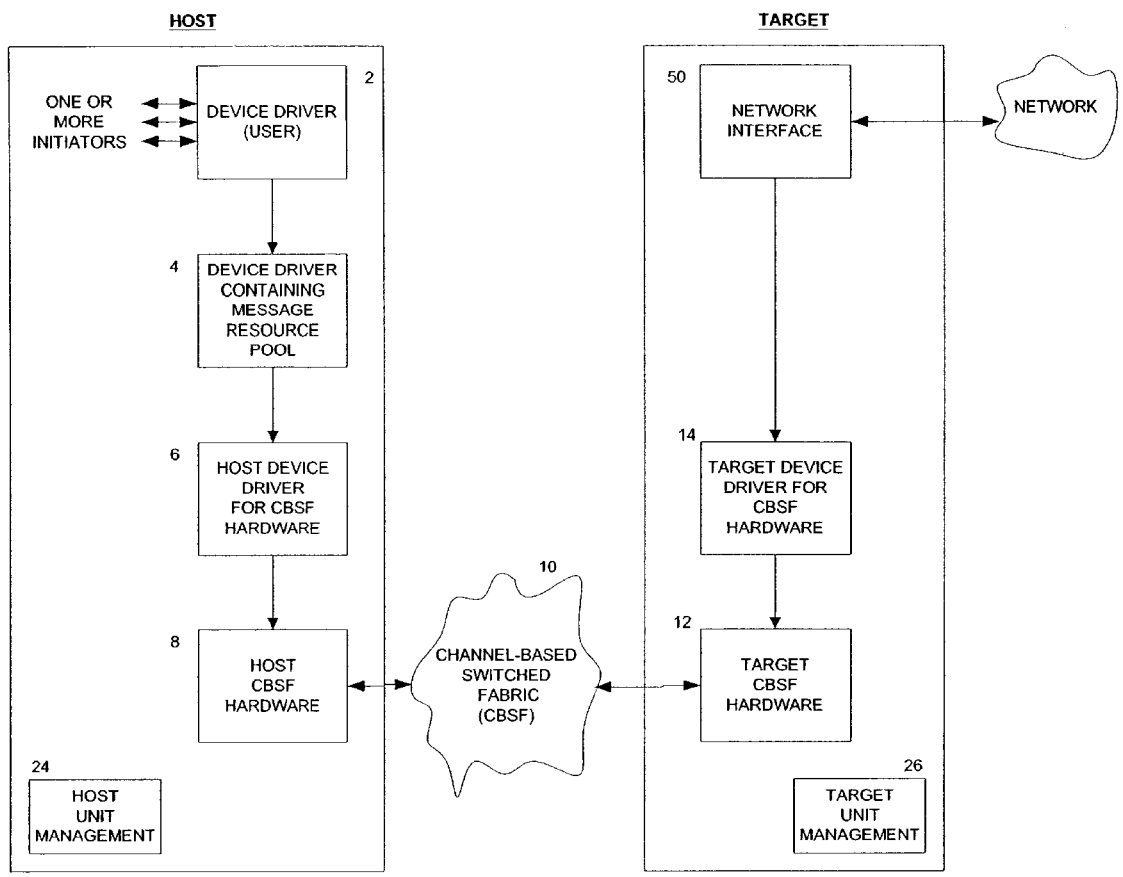
FIG. 8 is a block diagram of an example architecture with a target that has an interface to a network in an example embodiment of the present invention.

FIG. 8 shows a block diagram of an example architecture of another embodiment according to the present invention where a host interfaces to a target that interfaces to a network. The architecture is similar to that shown previously where a device driver was transferring data between an initiator and an I/O controller as shown in FIG. 1. In the embodiment shown in FIG. 8, however, the device driver 2 transfers data across the channel-based switched fabric 10 to a target that has a network interface 50 that connects to a network. The network connected to the network interface 50 may be any type of network, e.g., local area network (LAN), wireless local area network (WLAN), Transmission Control Protocol/Internet Protocol (TCP/IP), etc. The present invention is advantageous for use in a network environment in that network traffic in many cases has headers that are of a fixed size. For example, one buffer may be used for headers whose data may never change. A second buffer may be used for data that changes sometimes, and a third buffer or more may be used to transfer the actual data that may be changing. This reduces the work needed to send data in that only the buffers with data that may be changed need to be updated.

A message resource pool according to the present invention may be implemented in hardware, firmware, software or a combination of these and still be within the spirit and scope of the present invention. An example embodiment of the present invention may include a message resource pool computer software program that may be resident at all units and/or sides that are connected to a channel-based switched fabric and desire a message resource pool according to the present invention. Each of the processes discussed previously (e.g., initialize, get message, put message), or other functions (e.g., unit management), may be implemented as functions or subroutines of a message resource pool computer software program. Further, the computer software program implementing a message resource pool according to the present invention may be an object-oriented program where one or all of the processes mentioned may be objects in the object-oriented computer program. The computer software program may be executed by a controller, processor, I/O unit or other device or apparatus connected to a channel-based switched fabric. The example processes implemented as functions, subroutines, objects, etc. may invoke each other and pass data and/or parameters between each other as needed. An advantage to a software implementation of a message resource pool according to the present invention is that implementation as a software package that may be stored on desired units or other entities that transfer information across a channel-based switched fabric, or removed from them (e.g., uninstalled) makes the message resource pool portable and adaptable.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for a message resource pool comprising:
allocating at least one buffer, at least one descriptor, and at least one message element, each at least one element being associated with one at least one descriptor and at least one at least one buffer, the allocating being performed by a message resource pool;
registering the at least one buffer and the at least one descriptor with a unit management function, the registering being performed once by the message resource pool;
passing control of one at least one element and associated descriptor and at least one at least one buffer from the message resource pool to a user based on a request from the user; and
returning the control of the one at least one element and associated descriptor and at least one at least one buffer from the user to the message resource pool once use of the one at least one element and associated descriptor and at least one buffer by the user has completed.

2. The method according to claim 1, wherein the allocating is based on a request from the user.

3. The method according to claim 1, comprising receiving an element count, buffer sizes, and a maximum scatter-gather entries number from the user before the allocating.

4. The method according to claim 1, wherein the passing occurs in response to an asynchronous request from the user for the at least one element.

5. The method according to claim 4, comprising receiving a parameter from the user, the parameter notifying the message resource pool that control of all requested at least one element must be passed to the user at the same time.

6. The method according to claim 5, the parameter notifying the message resource pool that more that control of some of the requested at least one element may be passed to the user until control of all requested at least one element have been passed to the user.

7. The method according to claim 6, comprising queuing the asynchronous request from the user until control of all requested at least one element have been passed to the user.

8. The method according to claim 1, wherein the passing occurs in response to a synchronous request from the user for at least one element.

9. The method according to claim 8, wherein no control of the requested at least one element is passed to the user in response to the synchronous request if an asynchronous request has been queued.

10. The method according to claim 8, comprising receiving a parameter from the user notifying the message resource pool that control of all requested at least one element must be given to the user at the same time.

11. The method according to claim 1, wherein at least one of the at least one buffer, the at least one descriptor, and the at least one message element is aligned on a specific memory boundary.

12. The method according to claim 11, wherein each at least one descriptor is aligned on a 64 byte memory boundary.

13. The method according to claim 2, wherein the user is a device driver.

14. The method according to claim 1, wherein the allocating is for information transfer by one of a processor and an application.

15. The method according to claim 14, comprising multiple allocating for information transfer by one of a processor and an application.

16. A program, embodied in a tangible medium, when executed causes a computing device to perform:

allocating at least one buffer, at least one descriptor, and at least one message element, each at least one element being associated with one at least one descriptor and at least one buffer, the allocating being performed by a message resource pool;

registering the at least one buffer and the at least one descriptor with a unit management function, the registering being performed once by the message resource pool;

passing control of one at least one element and associated descriptor and at least one at least one buffer from the message resource pool to a user based on a request from the user; and returning the control of the one at least one element and associated descriptor and at least one at least one buffer from the user to the message resource pool once use of the one at least one element and associated descriptor and at least one at least one buffer by the user has completed.

17. The program according to claim 16, wherein the allocating is based on a request from the user.

18. The program according to claim 16, wherein the passing occurs in response to an asynchronous request from the user for the at least one element.

19. The program according to claim 18, comprising receiving a parameter from the user, the parameter notifying the message resource pool that control of all requested at least one element must be passed to the user at the same time.

20. The program according to claim 19, the parameter notifying the message resource pool that control of some of the requested at least one element may be passed to the user until control of all requested at least one element have been passed to the user.

21. The program according to claim 20, comprising queuing the asynchronous request from the user until control of all requested at least one element have been passed to the user.

22. The program according to claim 16, wherein the passing occurs in response to a synchronous request from the user for at least one element.

23. The program according to claim 22, wherein no control of the requested at least one element is passed to the user in response to the synchronous request if an asynchronous request has been queued.

24. The program according to claim 22, comprising receiving a parameter from the user notifying the message resource pool that control of all requested at least one element must be given to the user at the same time.

25. The program according to claim 16, wherein the allocating is for information transfer by one of a processor and an application.

26. The program according to claim 16, comprising multiple allocating for information transfer by one of a processor and an application.

27. A message resource pool system comprising:

a descriptor pool, the descriptor pool containing at least one descriptor;

a buffer pool, the buffer pool containing at least one buffer, each at least one descriptor being associated with at least one at least one buffer;

an element pool, the element pool containing at least one element, each at least one element containing pointers to one at least one descriptor and at least one at least one buffer; and a request queue, the request queue buffering uncompleted requests for at least one element from a user, wherein the message resource pool is allocated for use by a user, the message resource pool registering the contents of the message resource pool upon allocation and passing control of a specific number of at least one element to the user upon request for the specific number of at least one element by the user.

28. The message resource pool system according to claim 27, the at least one descriptor comprising information regarding data movement using the associated at least one buffer.

29. The message resource pool system according to claim 27, the at least one descriptor being associated with multiple at least one buffer that may be in noncontiguous memory locations.

* * * * *